S. A. RIDGE.
GLARE SHIELD FOR AUTOMOBILES.
APPLICATION FILED AUG. 16, 1916.
1,253,281. Patented Jan. 15, 1918.
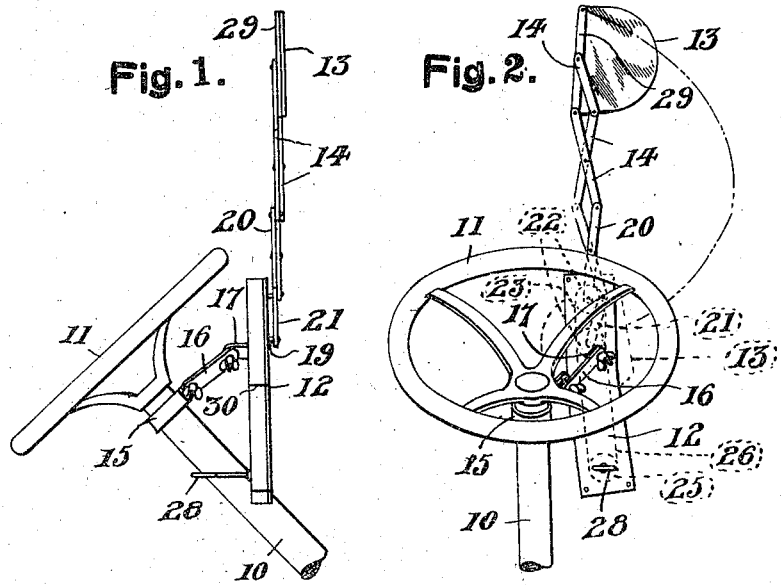
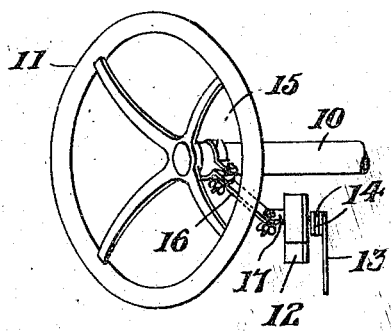
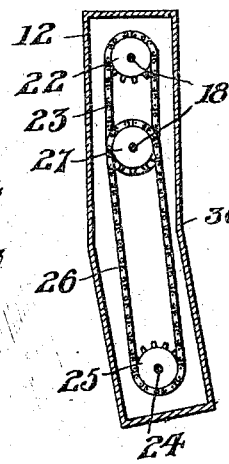
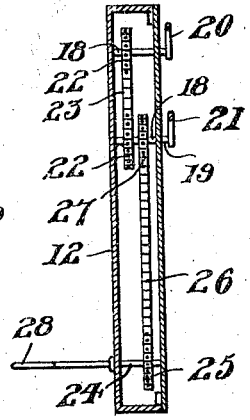
Inventor,
S. A. Ridge
By T. R. L. Bryant
Attorney

UNITED STATES PATENT OFFICE.

STOCKWELL A. RIDGE, OF ELMIRA, NEW YORK.

GLARE-SHIELD FOR AUTOMOBILES.

1,253,281.   Specification of Letters Patent.   Patented Jan. 15, 1918.

Application filed August 16, 1916.   Serial No. 115,156.

*To all whom it may concern:*

Be it known that I, STOCKWELL A. RIDGE, a citizen of the United States, residing at Elmira, in the county of Chemung and State of New York, have invented certain new and useful Improvements in Glare-Shields for Automobiles, of which the following is a specification.

This invention relates to certain new and useful improvements in glare shields for automobiles.

The primary object of the invention is the provision of a colored transparent or translucent eye-shield adjustably mounted upon any convenient portion of an automobile and readily shifted to a point in substantially the direct line of vision of the driver whereby any brightly illuminated body such as a headlight may be viewed without glaring the eyes.

A further object of the device is to provide a shiftable glare shield operatively arranged adjustably mounted adjacent the steering wheel of an automobile and adapted for movement in an arcuate path from a position beneath the wheel to one forwardly and above the plane thereof whereby the driver may observe the headlights of an oncoming automobile without being affected by the glare thereof.

A still further object of the device is a ready means for preventing the eyes of the driver of a vehicle from being dazzled and affected by any bright light positioned forwardly thereof.

With these general objects in view and others that will appear as the nature of the invention is better understood, the same consists in the novel combination and arrangement of parts hereinafter fully described, illustrated in the accompanying drawing, and pointed out in the claims.

In the drawings forming a part of this application and in which like designating characters refer to corresponding parts throughout the several views:—

Figure 1 is a side elevation of a steering wheel and post provided with the present device.

Fig. 2 is a rear elevation thereof.

Fig. 3 is a top plan view of the same.

Fig. 4 is a longitudinal sectional view through the mechanism casing of the device, and, Fig. 5 is a view similar to Fig. 4 taken upon a plane perpendicular to the plane of section of Fig. 4.

The device being primarily designed for employment with motor vehicles, the same is herein illustrated detachably mounted upon the inclined steering post sleeve 10 provided with the usual form of revoluble steering wheel 11.

The device broadly comprises a mechanism mount or casing 12 attached to the sleeve 10 and having a substantially semicircular shield 13 of colored or translucent material such as celluloid, colored mica or ground glass attached to the casing by means of the lazy-tongs 14. A clamp 15 is adjustably arranged upon the sleeve 10 having one or more adjustable links 16 connecting the said clamp with a projecting lug 17 carried by the casing 12 and whereby the said casing is mounted in a vertical or oblique plane slightly forwardly of the wheel 11, and slightly to the right thereof if desired.

Parallel axles 18 are transversely journaled through the casing 12 provided with extensions 19 projecting forwardly of the said casing and having the terminal links 20 and 21 at one end of the lazy-tongs 14 secured thereto. Similar sprocket wheels 22 are carried upon the axles 18 provided with a connecting chain 23. An operating shaft 24 is journaled through the lower end of the casing 12 being provided with a sprocket wheel 25 having a chain 26 passing thereover and also over a similar sprocket wheel 27 upon the adjacently positioned axle 18 arranged thereabove. A turn handle of any desired form such as 28 is carried upon the rearwardly projecting end of the shaft 24 and whereby the shaft is rotated for turning the axles 18 in a corresponding desired direction.

The terminal link 29 at the free end of the lazy-tongs 14 has the aforementioned shield 13 attached thereto laterally projecting therefrom toward either or each side of the vehicle. The casing 12 is preferably angular in form being bent as at 30 intermediate its length for arranging the operating shaft 24 and handle 28 conveniently positioned at one side of the steering post while the upper portion of the casing 12 is positioned vertically or obliquely more nearly directly forwardly of the wheel than would be otherwise possible.

The folded position of the lazy-tongs 14 and normal inoperative position of the shield 13 is adjacent the upper portion of the casing beneath the plane of the upper rim of the wheel 11, it being understood that the clamp 15 may be adjusted to a position much lower upon the sleeve 10 than that herein illustrated if found desirable, while the casing 12 may readily be adjusted to a lower position than that now shown without shifting the clamp 15. The casing in such cases may be arranged below the level of the upper end of the sleeve 10 allowing the shield 13 when projected to be positioned only slightly above the plane of the wheel 11.

Upon the approach of a brilliant headlight, the driver of the vehicle may grasp the handle 28 for revolving the shaft 24 and the axle 18 whereby the lazy-tongs 14 is opened giving an arcuate outward and upward path of travel to the shield 13 as best illustrated in Fig. 2 of the drawing, the said shield being positioned directly in front of the driver at the level of his eyes when operatively projected.

A reverse movement imparted to the handle 28 lowers the shield 13 by closing the lazy-tongs 14. It will be seen that a safety device is thus provided readily operated by the driver of a vehicle provided with the present attachment, which device may be adjustably secured at other convenient points upon the vehicle than the steering post sleeve if found desirable.

What I claim as new is:—

1. A glare shield comprising an angular casing having a portion substantially vertically positioned, axles journaled in said vertical portion of the casing, lazy-tongs having their links at one end secured to the said axles, an opaque shield secured to the links at the free end of the lazy-tongs, operative connections between the said axles, and operating means for the axles carried by the other portion of the casing.

2. A device of the class described comprising in combination with the steering wheel of a vehicle, an angular casing adjustably mounted forwardly thereof, a lazy-tongs carried by the upper portion of the said casing adapted for vertical arrangement forwardly of the wheel when in its projected open position, an eye shield carried by the free end of the lazy-tongs having an arcuate path of movement during the opening and closing operation of the lazy-tongs, and operating means for the lazy-tongs positioned within the casing and operable from a point beneath the wheel.

3. A glare shield comprising a mount, a lazy-tongs positionable in substantial longitudinal alinement therewith, a transulcent shield carried by the free end of the said lazy-tongs positioned substantially vertically of the said mount when the lazy-tongs is projected and having an arcuate path of travel laterally of the mount, and operating means for the said lazy-tongs.

In testimony whereof I affix my signature.

STOCKWELL A. RIDGE.